(12) United States Patent
Lutz et al.

(10) Patent No.: US 6,706,332 B1
(45) Date of Patent: Mar. 16, 2004

(54) METHOD OF COATING THIN-LAYERS ON GOLF BALLS

(75) Inventors: Mitchell E. Lutz, Fairhaven, MA (US); Matthew F. Hogge, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 13 days.

(21) Appl. No.: 10/357,717

(22) Filed: Feb. 4, 2003

(51) Int. Cl.⁷ .................................. B05D 1/22
(52) U.S. Cl. .................. 427/461; 427/459; 427/185
(58) Field of Search ................ 427/459–461, 427/185, 182–183; 101/DIG. 40; 118/308, 309, 634, DIG. 5

(56) References Cited

U.S. PATENT DOCUMENTS 4,264,075 A * 4/1981 Miller et al.
5,320,905 A * 6/1994 Vaughn et al.
6,217,464 B1 * 4/2001 Chang

OTHER PUBLICATIONS

Powder Coating, The Complete Finisher's Handbook , Ed by N.P. Liberto pp. 108–110, 1994.*

Nordson Corporation. ETI C030 Electrostatic Fluidized Bed Coater Article. Issued 8/95.

* cited by examiner

Primary Examiner—Fred J. Parker
(74) Attorney, Agent, or Firm—William B. Lacy

(57) ABSTRACT

A method for coating a golf ball comprising the steps of providing a golf ball component; providing a polymer material; creating a polymer particulate; fluidizing the polymer particulate; placing the golf ball component within the fluidized particulate; and fluidized coating the golf ball component with a thin layer of the polymer material.

18 Claims, No Drawings

METHOD OF COATING THIN-LAYERS ON GOLF BALLS

FIELD OF THE INVENTION

The present invention relates to golf balls and, more particularly, a method of coating thin layers on a variety of golf ball components and/or golf equipment.

BACKGROUND OF THE INVENTION

The modern golf ball may be constructed in virtually an unlimited number of ways. By altering ball construction and composition, manufacturers can vary a wide range of playing characteristics, such as resilience, durability, spin, and "feel," each of which can be optimized for various playing abilities. The golf ball components, in particular, that many manufacturers continually look to improve are the center or core, intermediate layers, if present, and covers.

One common way in which manufacturers adjust the properties of golf balls is by varying the construction of golf ball intermediate and cover layers. These layers have conventionally been formed by compression or injection molding various polymer materials, such as ionomers and polyurethanes of varying hardness and flexural moduli. Injection and compression molding, however, are not without problems and limitations. Both types of molding have practical limitations on layer thickness. It is difficult and impractical, if not impossible, to compression or injection mold a layer having a thickness of less than about 0.03 inches. It is not difficult to recognize that once layers become very thin uniformity problems arise. Additionally, it is particularly difficult to injection and compression mold layers onto soft golf ball cores because the resulting deformation of the core due to molding temperatures and pressures. Other types of molding, such as casting and reaction injection molding ("RIM") also have limitations. Casting processes generally have excessive waste and RIM mold parts are difficult to position to achieve a uniform layer. There remains a need, therefore, for improved methods for creating very thin, uniform polymer layers on golf balls and golf equipment.

SUMMARY OF THE INVENTION

The present invention is directed to a method for coating a golf ball comprising the steps of providing a golf ball component; providing a polymer material; creating a polymer particulate from the polymer material; fluidizing the polymer particulate; and coating the golf ball component with a thin layer of the polymer material by placing the golf ball component within the fluidized particulate.

The golf ball component can be any component normally used in the construction of a golf ball, but is preferably a solid center, a fluid-filled center, an outer core layer, an intermediate layer, a cover layer; an outer cover, or a golf ball.

The polymer material includes vinyl resins; polyolefins; polyurethanes; polyureas; polyamides; acrylic resins; thermoplastics; thermosets; polyphenylene oxide resins; thermoplastic polyesters; polycarbonates; acrylonitriles; butadiene styrenes; polybutylenes; polyethylenes; and blends of thermoplastic rubbers with polyethylenes; polypropylenes; polyacetals; nylons; polyesters; epoxies; glycidyl polymers; or cellulose esters.

The polymer particulate can be created by a number of grinding methods, including physical grinding, cryo-grinding, dispersion and evaporation, or surfactant foaming.

Fluidizing the particulate can further be effectuated by placing the polymer particulate in a reservoir; injecting compressed air into the reservoir; and allowing the air to percolate through the polymer particulate.

The compressed air may flow through a porous diffuser plate positioned below the reservoir and is preferably injected at a pressure of between about 5 psi and about 15 psi, at least at a pressure sufficient to separate the polymer particulate and cause density reduction.

The golf ball component may also be pre-heated prior to placing the component within the fluidized particulate, preferably using an oven, hot-air convection, or infrared heating to a temperature of between about 250° F. and about 500° F. Additionally, golf ball component to be coated may also be heated, before or after coating. At least one of the golf ball component or polymer particulate may also be charged prior to fluidized coating.

The golf ball component may also be prepared for coating by a variety of cleaning, preparing, and drying steps. Preferably, the coating has a thickness of less than about 0.03 inches, more preferably less than about 0.01 inches, most preferably between about 0.004 inches and about 0.01 inches.

The present invention is also directed to a method for coating a golf ball comprising the steps of providing a golf ball component; providing a polymer material; creating a polymer particulate from the polymer material; fluidizing the polymer particulate by injecting air through the polymer particulate; and coating the golf ball component with a thin layer of the polymer material by placing the golf ball component within the fluidized particulate.

DETAILED DESCRIPTION OF THE INVENTION

The golf balls of the present invention may comprise any of a variety of constructions, from a simple one-piece solid ball, to a two-piece ball formed of a core and cover, to a three piece dual core single cover to any multi-piece construction, but preferably include a core formed of a center and at least one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers, at least one of which may be an adhesive or coupling layer. The layers may be continuous or non-continuous (i.e., grid-like). The core may also comprise a solid or liquid filled center around which many yards of a tensioned elastomeric material are wound.

Fluidized bed powder coating is conventionally a process in which preheated metal parts are immersed in a fluidized bed of resin-based powdered material. The powder adheres to part surfaces, melts, and coalesces to form a coating layer. Any of the above-listed golf ball layers and components may be formed or coated with the fluidized bed powder coating method of the present invention.

The powder, which can be any thermoset or thermoplastic polymer, is first placed in a reservoir, such as an immersion tank (i.e., an open-top confining tank). Any polymer that is capable of being ground into a powder is suitable for the fluidized bed coating method of the present invention. Any means for grinding polymers into small particle size powders is suitable, however, a preferred method is by cryo-grinding. Preferred particle size is less than about 100 $\mu$m, more preferably less than about 75 μm, and most preferably less than about 50 μm.

Preferred polymers include, but are not limited to, vinyl resins, such as those formed by the polymerization of vinyl chloride, or by the copolymerization of vinyl chloride with vinyl acetate, acrylic esters or vinylidene chloride; Polyolefins, such as polyethylene, polypropylene, polybutylene and copolymers such as ethylene methylacrylate, ethylene ethylacrylate, ethylene vinyl acetate, ethylene metbacrylic or ethylene acrylic acid or propylene acrylic acid and copolymers and homopolymers produced using a single-site catalyst or a metallocene catalyst; Polyurethanes, such as those prepared from polyols and diisocyanates or polyisocyanates and those disclosed in U.S. Pat. No. 5,334,673; Polyureas, such as those disclosed in U.S. Pat. No. 5,484,870; Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like; Acrylic resins and blends of these resins with poly vinyl chloride, elastomers, and the like; Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem; Polyphenylene oxide resins or blends of polyphenylene oxide with high impact polystyrene as sold under the tradename NORYL® by GE; Thermoplastic polyesters, such as polyethylene terephthalate, polybutylene terephthalate, polyethylene terephthalate/glycol modified and elastomers sold under the tradenames HYTREL® by DuPont and LOMOD® by GE; Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and blends of thermoplastic rubbers with polyethylene, propylene, polyacetal, nylon, polyesters, cellulose esters, and the like. Thermoplastic materials are preferred due to their thicker and denser coating on the part surface.

Then the tank containing the powdered polymer is "fluidized" by injecting low pressure, dry compressed air through a porous diffuser plate or manifold at the bottom of the tank or reservoir. Injection pressures preferably range from about 5 psig to about 15 psig, and the dew point is typically controlled, preferably kept below 30° F. While any air flow rate is acceptable, an air flow rate on the order of about 5 cfm per square foot of diffuser plate is preferred. In one embodiment, air is entered into the reservoir and allowed to gently percolate up through the powder to ensure particle separation. In this way, the powder entrained with air has a substantial density reduction and takes on the consistency of a "fluid" so that solid objects, such as golf ball components, can be freely "dipped" into and lifted out of the "fluidized powder bed."

The powder particles may either be charged or non-charged. In one embodiment of the present invention, the golf ball components to be coated are heated prior to entering the fluidized bed for coating. In a second embodiment of the present invention, the components to be coated are charged (and optionally heated) prior to entering the fluidized bed for electrostatic coating with the charged polymer particulate. In a third embodiment of the present invention, the components to be coated are grounded (and optionally heated) prior to entering the fluidized bed for electrostatic coating with charged particulate. Any number of methods may be used to electrostatically charge either the component or the polymer powder (if necessary), but a preferred method is coating with a metal salt solution, such as Rahns Prep®, commercially available from ECC. It should be appreciated that the second embodiment, electrostatically-coating the layers, will provide a thinner layer than will the first embodiment.

In non-electrostatic applications, the golf ball component to be coated is passed through a heating source, such as a hot air convection oven or an infrared oven, to raise their temperature above the resin melting point, typically about 250° F. to about 500° F., before immersion in the fluidized bed. More preferably, the components are heated to less than about 400° F., and most preferably, between about 350° F. and about 400° F. While any temperature is suitable, it should be recognized that the temperature is preferably kept below the cross-linking temperature of the material being coated upon.

Components may be withdrawn from the fluidized bed partially- or fully-melted. If partially-melted, the created layer may have a molten inner layer of resin on the surface and a more granular, partially-softened outer layer of resin material. In order to complete the melting and surface flow of resin, coated components removed from the fluidized bed may be passed through another oven before final cool-down in an effort to slightly alter the properties of the coated polymer (compared to those completely melted as a continuous layer).

Electrostatic charging of powder in fluidized beds is done where a thin coating layer for example (e.g., less than about 0.01 inches) is desired. In this embodiment, powder adhesion is facilitated by grounding the components (or their carrying conveyor) and applying a voltage, preferably a negative voltage (e.g., 10–20 kV), to the powder, typically via a set of electrodes positioned near the air diffuser plate. The resultant electrostatic field causes powder particles at the top of the fluidized bed to leave the bed to form a "cloud" of charged powder. Golf ball components conveyed through the powder cloud attract the charged particles which adhere to their surfaces. The components are then passed through a curing oven in which the powder is heated to its melting temperature and forms a uniform layer.

Many powder compounds suitable for fluidized bed powder coating application onto golf ball components are commercially-available in ready-to-use form. The comparative characteristics and properties of the more commonly used compound types are presented below in Table 1.

TABLE 1

| Thermoplastic Powder Compounds | | | | |
|---|---|---|---|---|
| Characteristic or Example Specification | Polyethylene | Polypropylene | Nylon | Polyvinyl Chloride |
| General Characteristics | | | | |
| Hardness | fair | good | good | good |
| Impact Resistance | fair | fair | excellent | excellent |
| Solvent Resistance | very good | good | excellent | fair |
| Exterior Durability | fair | fair | excellent | excellent |
| Corrosion Protection | excellent | good | excellent | good |
| Chemical Resistance | excellent | good | good | good |
| Sample Fluidized Bed | | | | |

TABLE 1-continued

Thermoplastic Powder Compounds

| Characteristic or Example Specification | Polyethylene | Poly-propylene | Nylon | Polyvinyl Chloride |
|---|---|---|---|---|
| Process Parameters | | | | |
| Preheat Time (min) | 7 | 6 | 4 | 4 |
| Preheat Oven Temp. (° F.) | 650 | 675 | 650 | 600 |
| Dip Cycle Time (s) | 4 | 10 | 5 | 5 |
| Curing Time (s) | 5 | 60 | 60 | 60 |
| Curing Temp. (° F.) | 475 | 475 | 475 | 450 |
| Metal Thickness (in) | 0.125 | 0.0625 | 0.0625 | 0.0625 |
| Coating Thickness (in) | 0.015 | 0.010 | 0.010 | 0.010 |

The method of the present invention further includes steps of surface preparation (cleaning) and drying, optional preheating, immersion in the fluidized bed of powder, curing of the applied coating, cool-down, inspection, and rework, if required. Commonly utilized cleaning techniques include, but are not limited to, vapor degreasing, aqueous, semi-aqueous, hydrocarbon, dry media blasting, centerless grinding, and mechanical cleaning.

For fluidized bed powder coating of golf ball components, the cores or other components are most commonly attached to a conveyor. The conveyor track is lowered as the components pass over and through the edge of the powder-containing tank so they become immersed in the fluidized powder bed. At the distal end of the tank the conveyor track rises to lift coated components out of the bed. In another embodiment, the golf ball cores are held with tiny prongs, such as they are for convention spraying of paint or other coatings.

Once the desired layers have been coated using the fluidized bed method of the present invention, they may be additionally covered with outer layers (or, alternatively, layers may be formed prior to fluidized bed coating). Suitable polyurethane-type materials for construction of the various cover layers, preferably outer cover layers, include, but are not limited to, polyurethanes, polyurethane-ureas, polyurea-urethanes, polyureas, or epoxies, that generally comprise the reaction product of at least one polyisocyanate, polyol, polyamine, or secondary amine, and at least one amine or polyol curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H$_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline)

("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred bydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties. Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly (oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino) cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bis-propylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 90 to about 10%, more preferably from about 90 to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

The cores are substantially solid and form a center of a golf ball. The cores may also contain a liquid-, gas-, of gel-filled center. The cores of the present invention are surrounded by a single-layer or multiple-layer core or cover layers and are, optionally, painted, especially when a non-aliphatic or non-saturated polyurethane cover is employed. The balls may also include intermediate layers of molded or wound material as known by those of ordinary skill in the art. The present invention is therefore not limited to incorporating the cores into any particular golf ball construction and the present cores can be used in any constructions.

The materials for solid cores include compositions having a base rubber, a crosslinking agent, a filler, and a co-crosslinking or initiator agent, and preferably, a halogenated organosulfur compound. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The crosslinking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslinking agent is typically present in an amount greater than about 10 parts per hundred ("pph") parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; α,α-bis (t-butylperoxy) diisopropylbenzene; 2,5-dimethyl-2,5 di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent (at the same percent active oxygen content) to 4 pph of a concentrate peroxide that is 50% active (i.e., 2 divided by 0.5~4).

The halogenated organosulfur compounds of the present invention include, but are not limited to those having the following general formula:

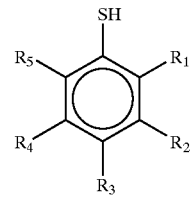

where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated organosulfur compound is pentachlorothiophenol, which is commercially available in neat form or under the tradename STRUKTOL® A95, a clay-based carrier containing the sulfur compound pentachlorothiophenol loaded at 45 percent (correlating to 2.4 parts PCTP). STRUKTOL® A95 is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 pph, more preferably between about 2.3 pph and about 5 pph, and most preferably between about 2.3 and about 4 pph.

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers may be added to one or more portions of the golf ball and typically may include processing aids or compounds to affect rheological and mixing properties, density-modifying fillers, fillers to improve tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes, if desired, a method to convert the cis-isomer of the polybutadiene resilient polymer component to the trans-isomer during a molding cycle and to form a golf ball. A variety of methods and materials suitable for cis-to-trans conversion have been disclosed in U.S. Pat. Nos. 6,162,135 and U.S. application Ser. No. 09/461,736, filed Dec. 16, 1999; 09/458,676, filed Dec. 10, 1999; and 09/461,421, filed Dec. 16, 1999, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The golf ball layers of the present invention can likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN®, polyethylene, ethylene copolymers, ethylpropylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolelins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified and elastomners sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Any of the cover layers can include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional co-monomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing $\alpha,\beta$-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733, 428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. No. 6,180,040 and U.S. Pat. No. 6,180,722 disclose methods of preparing dual core golf balls. The disclosures of these patents are hereby incorporated by reference in their entirety. However, the method of the invention is not limited to the use of these techniques.

The resultant golf balls typically have a coefficient of restitution of greater than about 0.7, preferably greater than about 0.75, and more preferably greater than about 0.78. The golf balls also typically have an Atti compression of at least about 30, preferably from about 50 to 120, and more preferably from about 60 to 100. A golf ball core layer, i.e., either the innermost core or any enclosing core layer, typically has a hardness of at least about 20 Shore A, preferably between about 20 Shore A and 80 Shore D, more preferably between about 30 Shore A and 65 Shore D.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 100 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 70 Shore D, more preferably between about 25 and about 50 Shore D, and most preferably between about 40 and about 48 Shore D. The inner cover layer preferably has a material hardness of less than about 70 Shore D, more preferably between about 20 and about 70 Shore D, and most preferably, between about 25 and about 65 Shore D.

The core of the present invention has an Atti compression of less than about 120, more preferably, between about 20 and about 100, and most preferably, between about 40 and about 80. In an alternative, low compression embodiment, the core has an Atti compression less than about 20.

The overall outer diameter ("OD") of the core is less than about 1.650 inches, preferably, no greater than 1.620 inches, more preferably between about 1.500 inches and about 1.610 inches, and most preferably between about 1.52 inches to about 1.60 inches. The OD of the inner cover layer is preferably between 1.580 inches and about 1.650 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The method and materials of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method for coating a golf ball comprising the steps of:

providing a golf ball component;

providing a polymer material selected from the group consisting of vinyl resins; polyurethanes; polyureas; polyamides; acrylic resins; polyphenylene oxide resins; thermoplastic polyesters; polycarbonates; acrylonitriles; butadiene styrenes; nolybutylenes; polyethylenes; blends of thermoplastic rubbers with polyethylenes; polypropylenes; polyacetals; nylons; polyesters; epoxies; glycidyl polymers; or cellulose esters;

creating a polymer particulate from the polymer material;

fluidizing the polymer particulate;

coating the golf ball component with a layer of the polymer material by placing the golf ball component within the fluidized particulate, such that the layer has a thickness of less than about 0.03 inches; and molding or casting a cover over the layer of polymer material, the cover comprising a polyurethane, an ionomer, or a polyurea material.

2. The method of claim 1, wherein the golf ball component is a solid center, a fluid-filled center, an outer core layer, an intermediate layer, a cover layer, an outer cover, or a golf ball.

3. The method of claim 1, wherein the step of creating a polymer particulate comprises physical grinding, cryogrinding, dispersion and evaporation, or surfactant foaming.

4. The method of claim 1, wherein the step of fluidizing further comprises the steps of:

placing the polymer particulate in a reservoir;

injecting compressed air into the reservoir; and allowing the air to percolate through the polymer particulate.

5. The method of claim 4, wherein the compressed air flows through a porous diffuser plate positioned below the reservoir.

6. The method of claim 4, wherein the compressed air is injected at a pressure of between about 5 psi and about 15 psi.

7. The method of claim 4, wherein the compressed air is injected at a pressure sufficient to separate the polymer particulate and cause density reduction.

8. The method of claim 1, further comprising the step of pre-heating the golf ball component prior to placing the component within the fluidized particulate.

9. The method of claim 8, wherein the component is pre-heated to a temperature of between about 250° F. and about 500° F.

10. The method of claim 8, wherein the step of pre-heating is accomplished using an oven, hot-air convection, or infrared heating.

11. The method of claim 1, further comprising the step of heating the coated golf ball component.

12. The method of claim 1, wherein at least one of the golf ball component or polymer particulate is charged prior to fluidized coating.

13. The method of claim 1, wherein the step of providing the golf ball component further comprises the steps of:

cleaning a surface of the component to be coated;

preparing the surface to receive the coating; and drying the surface.

14. The method of claim 1, wherein the thickness is less than about 0.01 inches.

15. The method of claim 14, wherein the thickness is between about 0.004 inches and about 0.01 inches.

16. A method for coating a golf ball comprising the steps of:

providing a golf ball component;

providing a polymer material;

creating a polymer particulate from the polymer material;

fluidizing the polymer particulate by injecting air through the polymer particulate; coating the golf ball component with a layer of the polymer material by placing the golf ball component within the fluidized particulate, such that the layer has a thickness of less than about 0.03 inches; and molding or casting a cover over the layer of polymer material, the cover comprising a polyurethane, an ionomer, or a polyurea material.

17. The method of claim 1, wherein the golf ball component is a solid center comprising a halogenated thiophenol.

18. A method for coating a golf ball comprising the steps of:

providing a golf ball core;

providing a polymer material;

creating a polymer particulate from the polymer material;

fluidizing the polymer particulate;

coating the core with a layer of the polymer material by placing the core within the fluidized particulate, such that the layer has a thickness of less than about 0.03 inches; and molding or casting a cover over the layer of polymer material, the cover comprising a polyurethane, an ionomer, or a polyurea material.

* * * * *